Sept. 10, 1929.  A. LIVESEY  1,728,067
APPARATUS FOR STRETCHING TEXTILE OR OTHER FABRICS OR MATERIALS
Filed Jan. 12, 1928
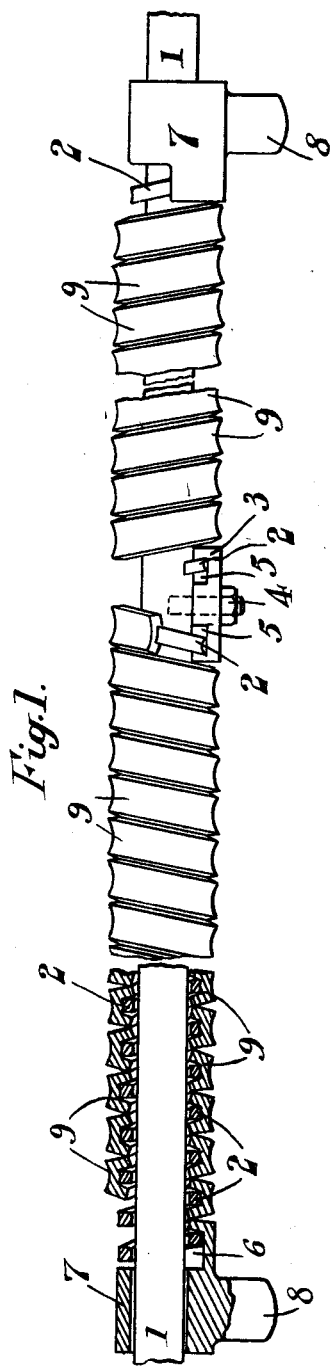
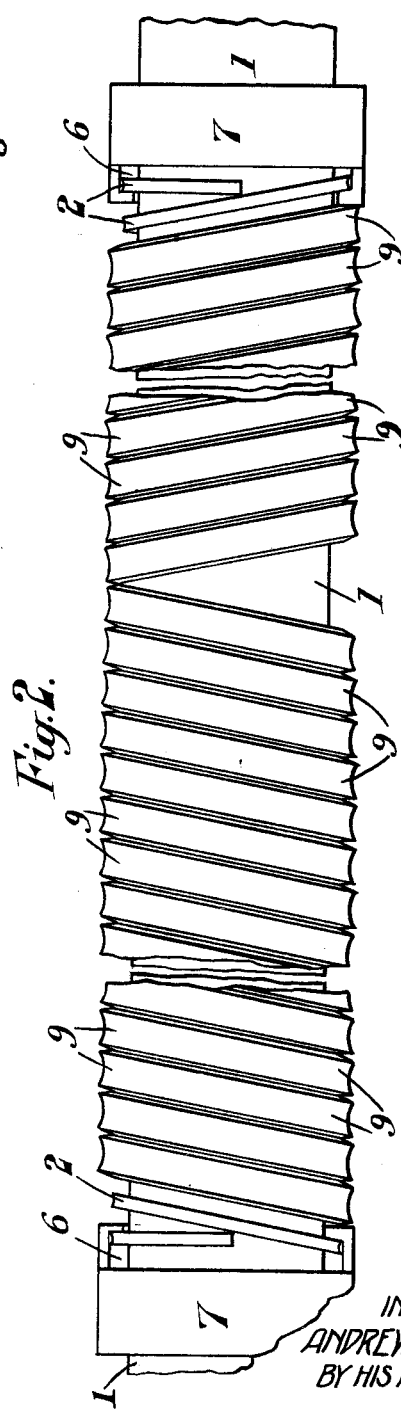
INVENTOR
ANDREW LIVESEY
BY HIS ATTORNEYS
Howson and Howson Patented Sept. 10, 1929.

1,728,067

UNITED STATES PATENT OFFICE.

ANDREW LIVESEY, OF MANCHESTER, ENGLAND.

APPARATUS FOR STRETCHING TEXTILE OR OTHER FABRICS OR MATERIALS.

Application filed January 12, 1928, Serial No. 246,250, and in Great Britain March 21, 1927.

This invention relates to apparatus for stretching textile or other fabrics or materials, the said apparatus being of the kind in which the fabric, or material, to be stretched passes over a cylinder constituted by end supports rotatably mounted on a shaft, or central carrier, the said supports having thereon a series of bars extending from one end support to the other, round each of which bars is a coiled spring, or coiled springs, and means for causing the said coiled spring, or springs, to extend from both ends whilst the fabric, or material, is in contact with them, so that they effect the stretching of the fabric, or material, from the mid part towards the sides thereof, more particularly the invention relates to apparatus such as that described and illustrated in Patent No. 1,088,599 granted to me on February 24th, 1914. An object of the invention is to provide an improved apparatus of the aforesaid kind whereby the stretching of the fabric, or material, is effected in a more efficient manner than hitherto.

In my aforesaid patent there is disclosed a construction wherein the material to be stretched is passed over coiled springs, these springs being extended from both ends while the material is in contact with them so that the springs affect stretching of the material in a direction away from the central line or mid-part of the width thereof. The springs, after they leave contact with the fabric, or material, contract and again come in contact with the fabric or material, and are then extended, thus acting upon the fabric or material as it passes lengthwise over them.

The apparatus disclosed in my aforesaid patent comprises rotatable end supports, a plurality of bars extending between and rotating with these end supports, slides mounted on the bars, stretching springs coiled on the bars and connected to the slides and means adapted simultaneously to move the slides longitudinally in opposite direction on the bars to operate the stretching springs.

The present invention is concerned only with the bars and the stretching springs which are coiled about them.

According to my invention I cover each of the coiled springs with a strip of rubber, or other resilient material, hereinafter referred to as the rubber cover, in such manner that the said rubber cover follows the spring round in its convolutions and is not merely stretched over the outer surface of the said spring, but extends down on each side thereof and fills up, or practically fills up, the spaces between the convolutions thus giving more surface contact to the fabric. The wire of which the springs are made is preferably rectangular in cross-section and the rubber covers, are of such shape in cross-section that they can be easily applied thereto, and cover three of the sides of the said wire, the middle, or outer, covered side being the side upon which the fabric, or material, to be stretched passes.

In the accompanying drawing Figure 1 shews in side elevation, with parts in section, and Figure 2 in plan, one of the aforesaid series of bars round which are coiled springs covered with rubber, or other resilient material, in accordance with my invention.

Referring to the drawing 1 indicates a bar around which is coiled springs 2 employed in the apparatus for stretching textile, or other fabrics, or material described and shewn in the specification of my prior Patent No. 1,088,599.

The inner ends of the springs 2 are shewn, by way of example, secured to the mid-part of the bar 1 by a piece 3 which is secured to the said bar by screws (one 4 of which is shewn in Figure 1) and has channels 5 formed therein for the reception of the end convolutions of the respective springs. The convolution at the outer end of each of the springs 2 is recived in a channel 6 formed in a slider 7 at, or towards, each end of the bar 1, each of the said sliders having a projection 8 thereon which engages a race, not shewn, by which the said sliders are caused to move along the said bar, so that the said springs are extended from both ends as described in my aforesaid prior specification.

Each of the springs 2 is covered, in accordance with this invention, with a strip of resilient material, such as rubber, 9. The springs 2 are shewn of approximately rectangular shape in cross-section and the rubber covers 9 are shewn channelled so that when stretched over the outer surface of the said springs the side walls of the said covers extend down on each side of the springs and fill up, or practically fill up, the spaces between the convolutions of the said springs so that the said cover affords a greater and more efficient surface contact for the fabric passing thereover.

The rubber covers 9 may be fitted on the springs after the latter has been coiled into the required shape and this may be effected by pressing portions of the opposite side walls of the channelled covers in a direction away from each other and then forcing the said opened portions onto the said springs so that by opening successive portions of the said cover and forcing them onto the said springs the whole length of the said cover is applied to the said springs. The ends of the covers may be secured to the springs by any suitable means.

There is thus provided a bar, a pair of springs coiled about the bar and a strip of resilient material also coiled about the bar and covering the convolutions of each of the springs. I may prefer to make this strip of resilient material, channel shaped as best illustrated in Figure 1 in order that it may cover the outer surfaces of the convolutions of each spring and at the same time extend down between the convolutions.

By covering coiled springs with rubber or other resilient material in accordance with my invention, the fabric, or material, to be stretched is more efficiently held and the liability of the said fabric resisting the drag exerted by the cover is reduced to a minimum.

What I claim is:—

1. In apparatus for stretching textile or other material, a bar, a pair of springs coiled about said bar, and a strip of channel-shaped resilient material also coiled about said bar, covering the outer surfaces of the convolutions of each spring and extending down between the convolutions.

2. In apparatus for stretching textile or other material, a bar, a pair of rectangular springs coiled about said bar, and a strip of channel-shaped resilient material also coiled about said bar, covering the outer surfaces of the convolutions of each spring and extending down between the convolutions.

3. In apparatus for stretching textile or other material, a bar, a pair of rectangular springs coiled about said bar, and a strip of channel-shaped rubber also coiled about said bar, covering the outer surfaces of the convolutions of each spring and extending down between the convolutions, substantially as described.

In testimony whereof I have signed my name to this specification.

ANDREW LIVESEY.